(12) United States Patent
Wood

(10) Patent No.: US 7,086,706 B1
(45) Date of Patent: Aug. 8, 2006

(54) SPINNER FOR BICYCLE HUB

(76) Inventor: Robert F. Wood, 41565 Corte Seda, Temecula, CA (US) 92592

( * ) Notice: Subject to any disclaimer, the term of this patent is extended or adjusted under 35 U.S.C. 154(b) by 41 days.

(21) Appl. No.: 11/020,073

(22) Filed: Dec. 21, 2004

Related U.S. Application Data

(60) Provisional application No. 60/565,195, filed on Apr. 26, 2004.

(51) Int. Cl.
B60B 7/20 (2006.01)
(52) U.S. Cl. ................................. 301/37.25; 301/37.41
(58) Field of Classification Search ............ 301/37.25, 301/37.41; 40/587; 280/217; 310/67 A
See application file for complete search history.

(56) References Cited

U.S. PATENT DOCUMENTS

| | | | | |
|---|---|---|---|---|
| 1,599,117 A | * | 9/1926 | Conlon | 280/217 |
| 3,317,246 A | * | 5/1967 | Wester | 301/37.41 |
| 3,847,443 A | * | 11/1974 | Laurion | 301/37.107 |
| 4,121,851 A | | 10/1978 | Finkenbiner | |
| 4,296,939 A | * | 10/1981 | Iwamoto | 280/212 |
| 6,655,061 B1 | | 12/2003 | Good | |
| 6,822,357 B1 | * | 11/2004 | Hung | 310/75 C |
| 6,899,400 B1 | * | 5/2005 | Cook | 301/37.25 |
| 2006/0061207 A1 | * | 3/2006 | Kessler et al. | 301/37.25 |

\* cited by examiner

Primary Examiner—Russell D. Stormer
(74) Attorney, Agent, or Firm—Calif Tervo Palomar Patent

(57) ABSTRACT

A spinner for attachment to the hub of a spoked bicycle wheel generally comprises a body assembly and a contact for contacting a spoke for spinning the spinner about the hub. The body assembly comprises a bearing portion comprised of a plurality of individual bearing arc sections adapted for insertion between the spokes of the wheel and joined around the hub and radial display surfaces, either integral with the arc sections or attached to the bearing portion. The display surface may include an attachable radially outer portion of different wheel sizes and configurations.

14 Claims, 2 Drawing Sheets

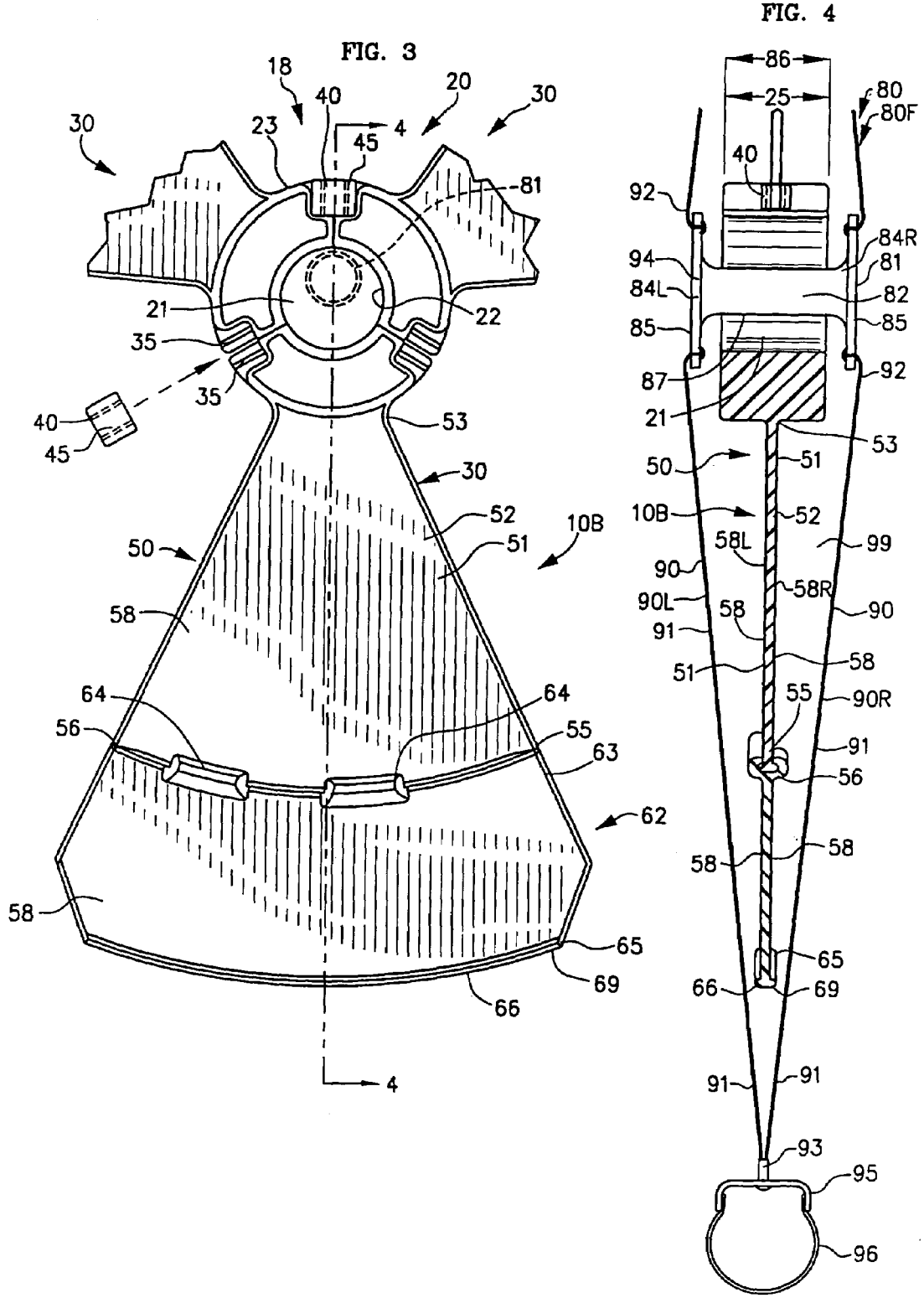

US 7,086,706 B1

SPINNER FOR BICYCLE HUB

CROSS-REFERENCE TO RELATED APPLICATIONS

This application claims the benefit of Provisional Application Ser. No. 60/565,195, filed Apr. 26, 2004.

FIELD OF THE INVENTION

This invention relates generally to a spinner for a spoked wheel, and more particularly involves a spinner that is assembled on the wheel hub and impacted by a spoke.

BACKGROUND OF THE INVENTION

Riding a bicycle around automobiles is dangerous, particularly at night when the bicycle is much more difficult for an automobile driver to see. Even if the bicycle has lights, the lights tend to be restricted to a head light and a tail light that provide little or no illumination toward the sides.

Reflective surfaces have long been attached to bicycle wheels to provide additional visibility. Such reflectors, rotating with the wheels, are particularly effective when a bicycle is moving. However, when the bike is stopped, the reflectors are stationary and are not easily recognized as designating a bicycle.

Therefore, there has been a need for an improved side reflector for a bicycle, particularly one that continues to move upon slowing or stopping of the bicycle so as to indicate the presence of a bicycle to automobile drivers.

SUMMARY OF THE INVENTION

The invention is a spinner for attachment to the hub of a spoked bicycle wheel and generally includes a body assembly and contact means for contacting a spoke for spinning the spinner about the hub.

The body assembly comprises a bearing portion for freely rotating mounting on the hub. The bearing portion is comprised of a plurality of individual bearing arc sections adapted for insertion between the spokes of the wheel and joined around the hub. Display surfaces, either integral with the arc sections or attached to the bearing portion, extend radially outward from the bearing portion.

In an exemplary embodiment, the width of the bearing portion is less than the width of the hub such that the body assembly may move laterally on the hub between a contacting position wherein the contacting means contacts a spoke and a free-spinning position wherein said contacting means is not contacting a spoke.

In an alternate embodiment, the display surface is comprised of a radially inner portion and a selectively attachable radially outer portion.

Other features and many attendant advantages of the invention will become more apparent upon a reading of the following detailed description together with the drawings wherein like reference numerals refer to like parts throughout.

BRIEF DESCRIPTION OF THE DRAWINGS

FIG. 3 is an enlarged partial side elevation view of the second embodiment of the spinner of FIG. 1.

FIG. 4 is a sectional view of a wheel and spinner taken on line 4—4 of FIG. 3.

DETAILED DESCRIPTION OF THE INVENTION

Figure 1:
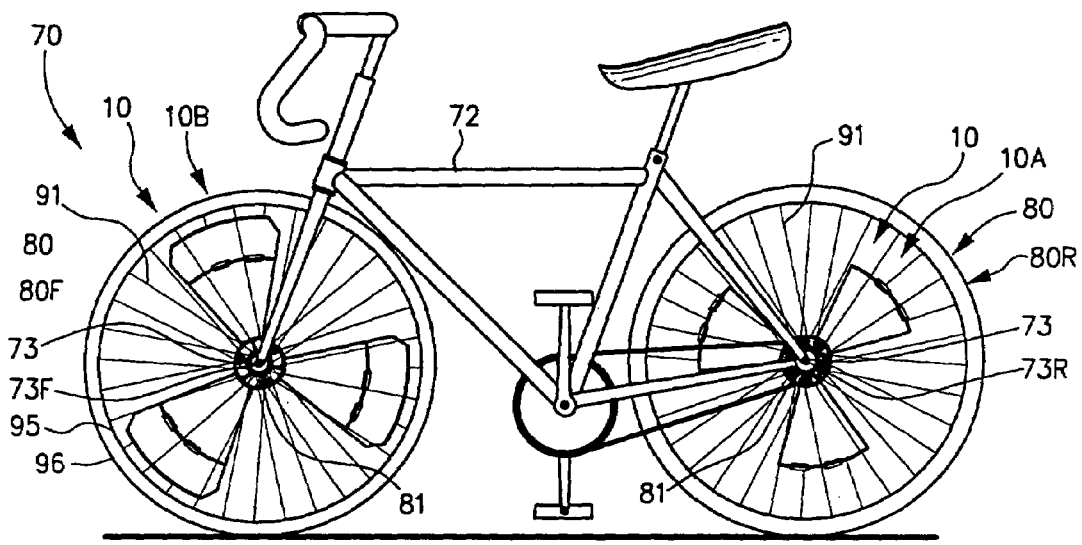
FIG. 1 is a side elevation view of a bicycle showing first and second embodiments of the spinner of the invention mounted on the wheels thereof.

With reference now to the drawings and first to FIGS. 1 and 4 thereon, there is shown in FIG. 1 a side elevation view of a bicycle 70 showing first 10A and second 10B embodiments of the spinner 10 of the invention mounted on the wheels 80 thereof and in FIG. 4 a partial lateral sectional view of the front wheel 80F and spinner 10B mounted thereon.

Bicycle 70 includes a frame 72 including axles 73 and wheels 80 mounted on axles 73. Each wheel 80 includes a hub 81 and spokes 91 radiating outward therefrom and supporting a rim 95 and tire 96. Hub 81 is rotatingly mounted on axle 73. Hub 81 includes a central portion 82 that is typically cylindrical and has an outside surface 87 and ends 84 defining a width 86 therebetween. Each left and right end 84L, 84R generally includes a radially outward flange 85, as shown. Each spoke 91 has an inner end 92 attached to an end 84, such as to flange 85, and an outer end 93 attached to rim 95.

As best seen in FIG. 4, left and right sets 90L, 90R of spokes 91, radiating outward from the left and right ends 84L, 84R respectively of hub 81, converge to support rim 95 so as to form a triangular space 99 between left and right sets 90L, 90R of spokes 91 and hub 81. Spinners 10B, 10A are mounted on front and rear hubs 81F, 81R of assembled front and rear wheels 80F, 80R within the space 99 of each wheel 80.

Figure 2:
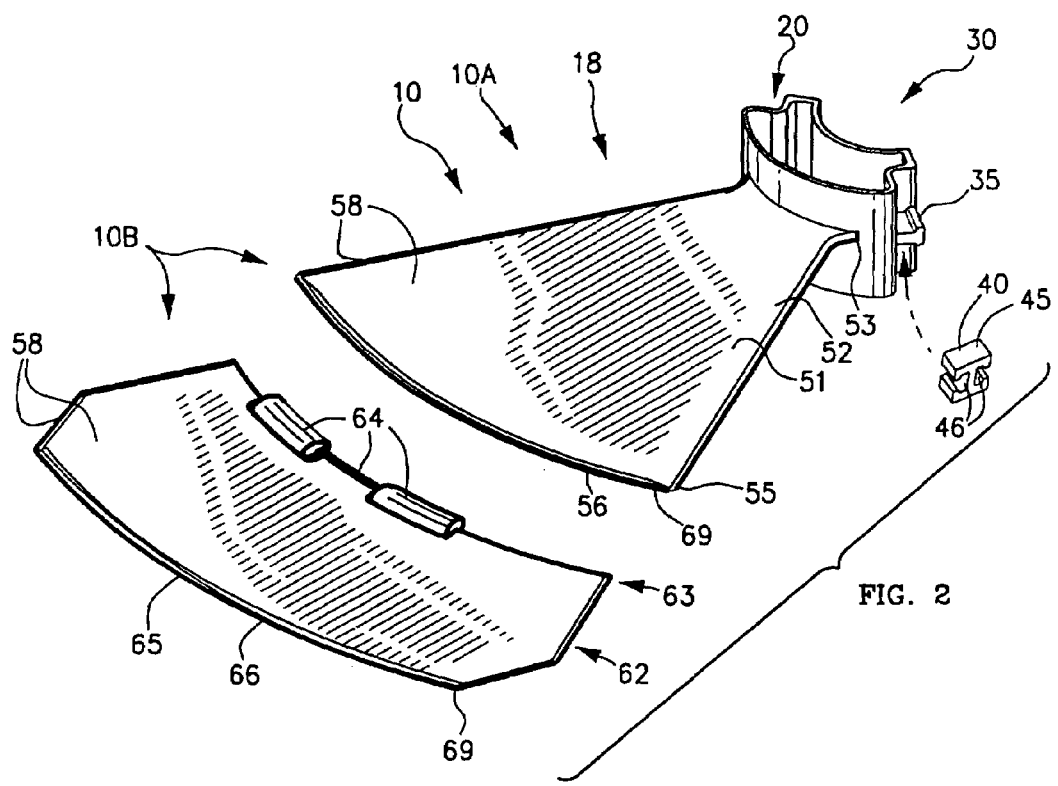
FIG. 2 is an exploded perspective view of a preferred embodiment of some of the elements of the spinner of the invention

Further including FIGS. 2 and 3, FIG. 2 is an exploded perspective view of a preferred embodiment of some of the elements of the spinner 10B of the invention, and FIG. 3 is an enlarged partial side elevation view of spinner 10B of FIG. 1. Spinner 10B is the same as spinner 10A plus one or more selectively attachable outer portions 62. Spinner 10A is used on small wheels 80 or rear wheels 80R that have a shorter radial distance between the lateral center of hub 81 and any spoke 91.

Spinner 10A generally comprises a body assembly 18 and contacting means 69, such as a flange 56, connected to body assembly 18 for contacting a spoke 91 for spinning spinner 10A about hub 81. Body assembly 18 includes a bearing portion 20 for mounting around hub 81 and displaying means 50 for displaying a surface 58. Bearing portion 20 is generally cylindrical with a width 25, an outside 23, and a lateral bore 21 with inside surface 22 adapted, such as being cylindrical, to be freely rotating around hub 81. Preferably, bore 21 is sufficient large to fit loosely over hub 81 such that bearing portion 20 will attach to almost any size hub 81. Preferably, width 25 of bearing portion 20 is less than width 86 of hub 81 such that bearing portion 20 can move laterally on hub 81.

Bearing portion 20 is comprised of a plurality of individual bearing arc sections 30 and joining means 40 for joining bearing arc sections 30 together around hub 81. Each bearing arc section 30 is adapted for insertion between spokes 91 of assembled wheel 80 for disposition around hub 81. In the embodiment shown, bearing portion 20 is comprised of three bearing arc sections 30 of 120 degrees each. Bearing arc members 30 need not be identical.

Joining means 40 may be any suitable means for joining the individual bearing arc sections 30 around hub 81. For example, bearing arc sections 30 may include grooves and slots so that they may slidingly engage one another. In the embodiment shown, joining means 40 comprises a sliding catch 45 having channels 46 adapted for engaging flanged rails 35 on adjoining bearing arc sections 30. Three such catches 45 are used to join the three arc sections 30.

In the embodiment shown, displaying means 50 for spinner 10A is a radial fin 51 having left and right display faces 58L, 58R and comprising an inner portion 52. Inner portion 52 has an inner end 53 attached to bearing portion 20, such as to an individual bearing arc section 30. Alternately, inner end 53 of fin 51 could be attached or attachable to two or more bearing arc sections 30 or could be attachable as joining means 40 for arc sections 30. Inner portion 52 has a radially outward end 55 having a sideward extension or flange 56.

Spinner 10A includes contacting means 69, such as outer end 55 of inner portion 52 or flange 56, connected to body assembly 18 for contacting a spoke 91 for spinning spinner 10A about hub 81. Other contacting means that extend laterally for contacting a spoke 91 could be used.

Spinner 10B is spinner 10A wherein the body assembly 18 includes one or more outer portions or radial extensions 62 attached to spinner 10A as radially outward extensions of fin 51. Radial extension 62 is attached to inner portion 52 by any suitable means, such as channel 64 on radially inward end 63 that slide over flange 56 on outer end 55 of inner portion 52 with movement along an arc. This attachment may be a friction fit or include detent means on one or both members 52, 62. Extension 62 has a radially outward end 65 having a sideward extension or flange 66. Extension 62 includes contacting means 69, such as outer end 65 or flange 66, for contacting a spoke 91 for spinning spinner 10B about hub 81. Other contacting means that extend laterally for contacting a spoke 91 could be used.

Preferably, extension 62 includes right and left display faces 58L, 58R. Reflective displays attached to left and right display faces 58L. 58R greatly increase the visibility of bicycle 70

In the embodiment shown in FIG. 4, width 25 of bearing portion 20 is less than the width 86 of hub 81 such that body assembly 18 may move laterally on hub 81 between a contacting position wherein the contacting means 69 contacts a spoke 91 and a free-spinning position, shown, wherein contacting means 69 is not contacting a spoke 91. The spinner 10 of this configuration works as follows. When bicycle 70 is moving, any tilting or lateral movement of bike 70, such as when first starting or when cornering, causes spinner 10 to slide laterally on hub 81 such that contacting means 69, such as outer end 65 or flange 66, is impacted by a spoke 91. Spinner 10 is spun up and tends to center on hub 81 as shown in FIG. 4 wherein it does not contact a spoke 91. Spinner 10 then spins at the rotation speed of wheel 80 or faster from impact with a spoke 91. When a moving bicycle 70 stops, spinner 10 continues to spin for a period of time.

Spinner 10A is mounted on hub 81 of assembled wheel 80 by inserting the individual bearing arc sections 30 between spokes 91 and joining them by joining means 40 around hub 81. For Spinner 10B, radial extensions 62 may be attached before inserting individual arc sections 30 should spacing of spokes 91 permit, otherwise radial extensions 62 may be individually inserted between spokes 91 and attached to spinner 10A in situ.

Although a particular embodiment of the invention has been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. A spinner for attachment to a wheel including a hub having a central portion having an outside surface and a left end and a right end defining a width therebetween and left and right sets of spokes radiating outward from the left and right ends respectively of the hub and supporting a rim; said spinner comprising:
    a body assembly comprising:
        a bearing portion for mounting on the hub; said bearing portion having a width and having an inside surface adapted to be freely rotating around the hub; said bearing portion comprising:
            a plurality of individual bearing arc sections; each bearing arc section adapted for insertion between the spokes of the wheel for disposition around the hub; and
            joining means for joining together said bearing arc sections around the hub; and
        displaying means including:
            an inner end connected to said bearing portion; and
            a radially outward end; said displaying means for displaying a surface; and
    contacting means connected to said body assembly for contacting a spoke for spinning said spinner about the hub.

2. The spinner of claim 1 wherein:
said width of said bearing portion is less than the width of the hub such that said bearing portion may move laterally on the hub between a contacting position wherein said contacting means contacts a spoke and a free-spinning position wherein said contacting means is not contacting a spoke.

3. The spinner of claim 1 wherein:
said displaying means comprises:
    an inner displaying means comprising:
        an inner end connected to said bearing portion; and
        a radially outward end; and
    an outer portion comprising:
        an inner end removably connected to said inner displaying means and projecting radially outward from said inner displaying means.

4. The spinner of claim 1 wherein:
said contacting means is the radially outward end of said display means.

5. In combination:
a wheel including:
    a hub including:
        a central portion including:
            an outside surface;
            a left end; and
            a right end defining a width therebetween; and
        left and right sets of spokes radiating outward from said left and right ends respectively of said hub and supporting a rim; and a spinner comprising:
- a body assembly comprising:
  - a bearing portion for mounting on said hub; said bearing portion having a width and having an inside surface adapted to be freely rotating around said hub; said bearing portion comprising:
    - a plurality of individual bearing arc sections; each bearing arc section adapted for insertion between said spokes of said wheel for disposition around said hub; and
    - joining means for joining together said individual bearing arc sections around said hub; and
  - displaying means including:
    - an inner end connected to said bearing portion; and
    - a radially outward end; said displaying means for displaying a surface; and
- contacting means connected to said body assembly for contacting a said spoke for spinning said spinner about said hub.

6. The combination of claim 5 wherein:
said contacting means is said radially outward end of said display means.

7. The combination of claim 5 wherein:
said width of said bearing portion is less than the width of said hub such that said bearing portion may move laterally on said hub between a contacting position wherein said contacting means contacts a said spoke and a free-spinning position wherein said contacting means is not contacting a said spoke.

8. The combination of claim 5 wherein:
said displaying means comprises:
- an inner displaying means comprising:
  - an inner end connected to said bearing portion; and
  - a radially outward end; and
- an outer portion comprising:
  - an inner end removably connected to said inner displaying means; and
  - a radially outward end.

9. The combination of claim 8 wherein:
said contacting means is said radially outward end of outer portion of said display means.

10. A method of attaching a spinner to a bicycle wheel including a hub having a central portion having an outside surface and a left end and a right end defining a width therebetween and left and right sets of spokes radiating outward from the left and right ends respectively of the hub and supporting a rim; the method comprising the step of:
- inserting a plurality of individual bearing arc sections between the spokes;
- joining the inserted bearing arc sections into a bearing portion mounting on the hub; the bearing portion having a width and having an inside surface adapted to be freely rotating around the hub.

11. The method of claim 10 wherein:
the inserted bearing arc sections each include: displaying means including an inner end connected to the bearing portion; and a radially outward end; the displaying means for displaying a surface; and contacting means for contacting a spoke for spinning the spinner about the hub.

12. The method of claim 11 further including:
attaching a radial extension of the display means to the display means.

13. The method of claim 11 further including:
- inserting between the spokes a radial extension of the display means; and
- attaching the radial extension to an inserted bearing arc section.

14. The method of claim 10 wherein:
the width of the bearing portion is less than the width of the hub such that the bearing portion may move laterally on the hub between a contacting position wherein said contacting means contacts a spoke and a free-spinning position wherein said contacting means is not contacting a spoke.

\* \* \* \* \*